(12) United States Patent
Marcone et al.

(10) Patent No.: US 12,538,235 B2
(45) Date of Patent: Jan. 27, 2026

(54) UPLINK TRANSMISSION POWER CONTROL ADJUSTMENT

(71) Applicant: NOKIA TECHNOLOGIES OY, Espoo (FI)

(72) Inventors: Alessio Marcone, Munich (DE); Nhat-Quang Nhan, Reims (FR); Marco Maso, Issy-les-Moulineaux (FR)

(73) Assignee: Nokia Technologies Oy, Espoo (FI)

( * ) Notice: Subject to any disclaimer, the term of this patent is extended or adjusted under 35 U.S.C. 154(b) by 667 days.

(21) Appl. No.: 18/062,740

(22) Filed: Dec. 7, 2022

(65) Prior Publication Data

US 2023/0180135 A1 Jun. 8, 2023

Related U.S. Application Data

(63) Continuation of application No. PCT/EP2022/051293, filed on Jan. 21, 2022.

(60) Provisional application No. 63/287,332, filed on Dec. 8, 2021.

(51) Int. Cl.
*H04W 52/14* (2009.01)
*H04L 5/00* (2006.01)
*H04W 52/32* (2009.01)

(52) U.S. Cl.
CPC ......... *H04W 52/146* (2013.01); *H04L 5/0051* (2013.01); *H04W 52/325* (2013.01)

(58) Field of Classification Search
CPC .. H04L 5/0051; H04W 52/146; H04W 52/325
See application file for complete search history.

(56) References Cited

U.S. PATENT DOCUMENTS

2023/0276369 A1\* 8/2023 Fu .................. H04L 5/0051
370/329
2023/0291523 A1\* 9/2023 Hasegawa ........... H04W 52/281

OTHER PUBLICATIONS

3GPP TS 38.213 V16.7.0; 3rd Generation Partnership Project; Technical Specification Group Radio Access Network; NR; Physical Layer Procedures for Control (Release 16); Sophia Antipolis, Valbonne, France; Sep. 2021; 188 pages.

\* cited by examiner

*Primary Examiner* — Brian P Cox
(74) *Attorney, Agent, or Firm* — Brake Hughes Bellermann LLP

(57) ABSTRACT

There are provided measures for performing uplink transmission power adjustment according to a transmit power control command in an uplink transmission using at least two transmission occasions, wherein the uplink transmission comprises a reference signal, and wherein a signal property of the reference signal is configured to be maintained in a time window.

15 Claims, 10 Drawing Sheets

UPLINK TRANSMISSION POWER CONTROL ADJUSTMENT

RELATED APPLICATIONS

This is a continuation of International Application No. PCT/EP2022/051293, filed Jan. 21, 2022, entitled "UPLINK TRANSMISSION POWER CONTROL ADJUSTMENT" which claims priority to U.S. Provisional Application No. 63/287,332, filed Dec. 8, 2021, both of which are hereby incorporated by reference in their entireties.

This application claims priority to U.S. Provisional Application No. 63/287,332, filed Dec. 8, 2021, which is hereby incorporated by reference in its entirety.

FIELD

The present invention relates to the field of wireless communications. More specifically, the present invention relates to methods, apparatus, systems and computer programs for uplink transmission power control adjustment.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as 5G New Radio (NR) radio-access technology (RAT). NR is being standardized by the 3rd Generation Partnership Project (3GPP). The various development stages of the 3GPP LTE specifications are referred to as releases.

Uplink power control is used in a wireless communication system, such as NR, to determine an appropriate transmit power for data transmission from a UE in the wireless communication system. This may include the channel and the noise and interference level at the receiver side. The determining may further include controlling of the modulation and coding scheme (MCS) to ensure a reliable uplink data transmission. In the case of unreliable uplink data transmission, it is thus possible to increase the transmit power and/or reduce the data rate by selecting a more robust MCS.

The power control procedure of a communication system may comprise the transmission of transmit power control (TPC) commands by which the network can increase or decrease the transmit power of one or more UEs. TPC commands may be used for closed-loop power control and may be transmitted in downlink control information (DCI), for example, by using DCI format 2_2 in NR. The transmission and processing of TPC commands is in the following referred to as uplink transmission power adjustment or power adjustment.

There may be restrictions on when a TPC command for uplink power adjustment may take effect in a UE, as uplink power adjustment may affect the use of certain features in a communication system. For example, a communication system, such as NR, may offer a feature often referred to as "DMRS bundling" or "joint channel estimation" in NR for data transmissions on channels, such as PUSCH and PUCCH in NR. This feature targets improvements in the channel estimation quality for the demodulation of PUSCH/PUCCH at the receiver (gNB) by using jointly the DMRS symbols among several PUSCH/PUCCH transmissions (likely in different slots) that comply with required conditions to maintain a certain signal property, such as power consistency and/or phase continuity.

Reference signal transmissions, such as DMRS symbols, can only be used jointly among several PUSCH/PUCCH transmissions at a receiving device, e.g., gNB, to provide a more reliable channel estimate if they are subject to very similar, if not identical, channel and/or transmission conditions. For this reason, when the DMRS bundling feature is enabled, the UE may be expected to maintain power consistency and phase continuity within one or multiple time domain windows (TDW). The one or multiple TDWs may be determined based on two steps:

Firstly, one or multiple nominal TDWs may be determined such that they cover the entire time span of the PUSCH/PUCCH transmissions.

Secondly, within a nominal TDW, if UE may not be capable of maintaining power consistency and phase continuity due to the occurrence of a certain event, the nominal TDW may be segmented into multiple actual TDWs, wherein the UE is required to keep power consistency and phase continuity. The certain event could be, for instance, a change of transmission power across the PUSCH/PUCCH transmissions, due to a TPC command transmitted by the network.

Therefore, there is a need to specify a processing scheme in a communication system to define whether and when uplink power adjustments due to a TPC command take effect in a UE, when the DMRS bundling feature is enabled. In particular, this processing scheme should be independent of the type of downlink control information in which a TPC command is transmitted.

SUMMARY

In a first aspect, there is provided a method comprising receiving configuration information for configuring a transmission of a reference signal, wherein a signal property of the reference signal is configured to be maintained in a time window, and receiving control information for controlling an uplink transmission using at least two transmission occasions comprising the reference signal, wherein a first transmission occasion occurs within the time window and before a second transmission occasion. The method further comprising determining a first time interval, wherein the first time interval starts at a first starting point and ends at the latest with the start of the first transmission occasion, and determining a second time interval, wherein the second time interval starts at a second starting point and ends at the latest with the start of the second transmission occasion, wherein the first starting point coincides with the second starting point if the second transmission occasion also occurs within the time window, and otherwise the second starting point is after the first starting point. The method further comprising receiving at least one transmit power control command for uplink transmission power adjustment, and performing an uplink transmission power adjustment according to the at least one transmit power control command that takes effect only in the second transmission occasion but not in the first transmission occasion, if the at least one transmit power control command is received after the first starting point but not after the second starting point.

The first starting point may be one of:
first symbol of the time window,
a symbol offset by a predetermined number of symbols from the first symbol of the time window,
a last symbol of a control channel carrying the control information,
a symbol offset by a predetermined number of symbols from the last symbol of a control channel carrying the control information,
($N_{symb}^{slot} \times k2 + 1$)-th symbol after the control channel carrying the control information, wherein $N_{symb}^{slot}$ is a number of symbols per slot, and k2 is minimum of a set of values provided by higher layer signalling,
symbol after the end of the previous time window,
($N_{symb}^{slot} \times k2 + 1$)-th symbol before the first symbol of the time window, wherein $N_{symb}^{slot}$ is a number of symbols per slot, and k2 is minimum of a set of values provided by higher layer signalling.

The reference signal may be a demodulation reference signal.

The signal property may be at least one of:
phase continuity, and
power consistency.

The control information may be received in a dynamic grant or in an activation of a configured grant or in radio resource control signalling.

The configuration information may be received in radio resource control signalling.

The uplink transmission may be transmitted in a radio access network for New Radio.

In a second aspect, there is provided an apparatus comprising at least one processor and at least one memory including a computer program code, the at least one memory and the computer program code configured to, with the at least one processor, cause the apparatus at least to receive configuration information for configuring a transmission of a reference signal, wherein a signal property of the reference signal is configured to be maintained in a time window, and to receive control information for controlling an uplink transmission using at least two transmission occasions comprising the reference signal, wherein a first transmission occasion occurs within the time window and before a second transmission occasion. The at least one memory and the computer program code are further configured to, with the at least one processor, cause the apparatus to determine a first time interval, wherein the first time interval starts at a first starting point and ends at the latest with the start of the first transmission occasion, and to determine a second time interval, wherein the second time interval starts at a second starting point and ends at the latest with the start of the second transmission occasion, wherein the first starting point coincides with the second starting point if the second transmission occasion also occurs within the time window, and otherwise the second starting point is after the first starting point. The at least one memory and the computer program code are further configured to, with the at least one processor, cause the apparatus to receive at least one transmit power control command for uplink transmission power adjustment, and perform an uplink transmission power adjustment according to the at least one transmit power control command that takes effect only in the second transmission occasion but not in the first transmission occasion, if the at least one transmit power control command is received after the first starting point but not after the second starting point.

The first starting point may be one of:
first symbol of the time window,
a symbol offset by a predetermined number of symbols from the first symbol of the time window,
a last symbol of a control channel carrying the control information,
a symbol offset by a predetermined number of symbols from the last symbol of a control channel carrying the control information,
$N_{symb}^{slot} \times k2 + 1$)-th symbol after the control channel carrying the control information, wherein $N_{symb}^{slot}$ is a number of symbols per slot, and k2 is minimum of a set of values provided by higher layer signalling,
a symbol after the end of the previous time window,
$N_{symb}^{slot} \times k2 + 1$)-th symbol before the first symbol of the time window, wherein $N_{symb}^{slot}$ is a number of symbols per slot, and k2 is minimum of a set of values provided by higher layer signalling.

The reference signal may be a demodulation reference signal.

The signal property may be at least one of:
phase continuity, and
power consistency.

The control information may be received in a dynamic grant or in an activation of a configured grant or in radio resource control signalling.

The configuration information may be received in radio resource control signalling.

The uplink transmission may be transmitted in a radio access network for New Radio.

In a third aspect, there is provided an apparatus comprising means for performing a method according to embodiments of the first aspect.

In a fourth aspect, there is provided a computer program embodied on a non-transitory computer-readable storage medium, the computer program comprising program code for controlling a process to execute a method according to embodiments of the first aspect.

In a fifth aspect, there is provided a computer program product for a computer, comprising software code portions for performing the steps of a method according to embodiments of the first aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
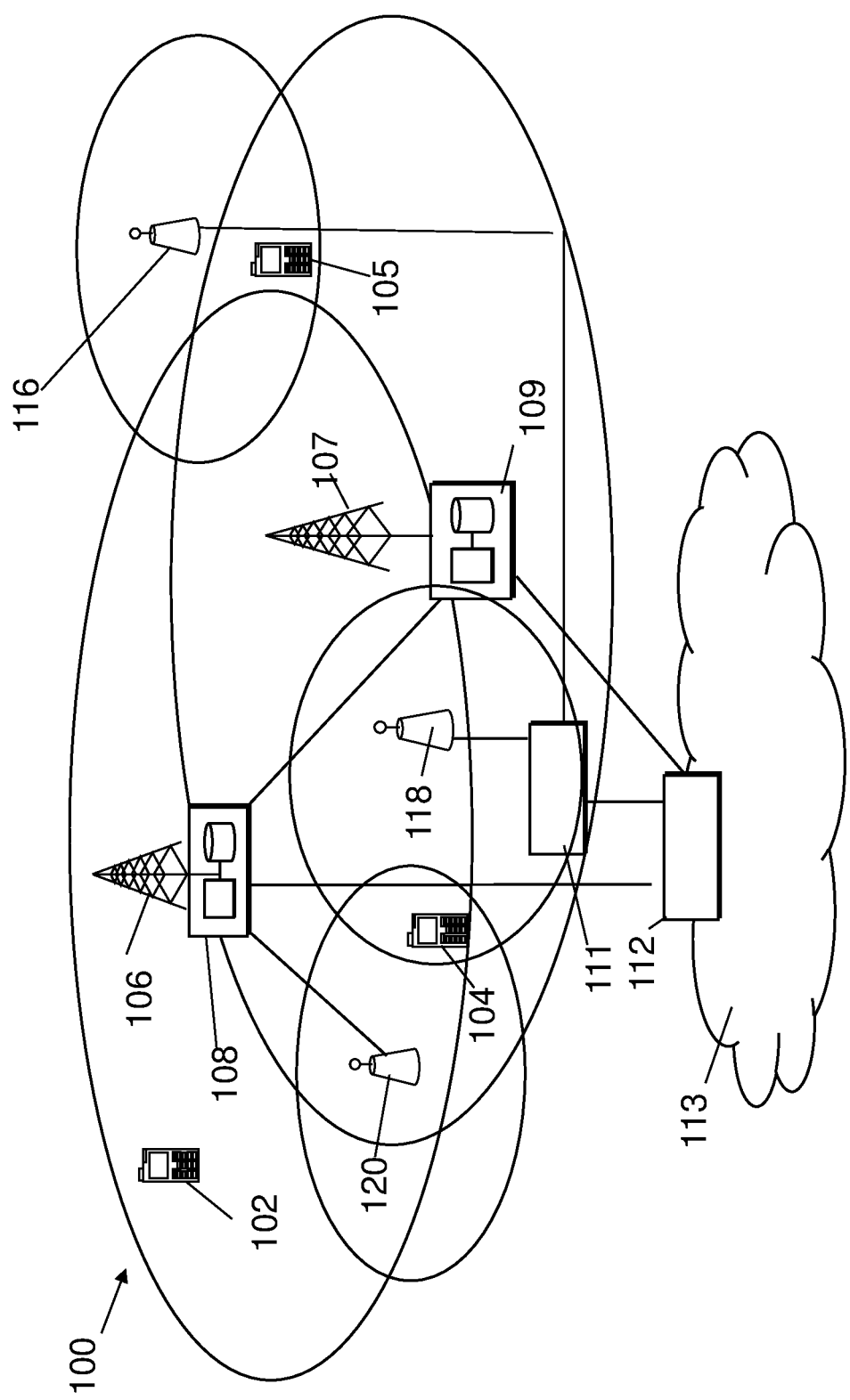
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
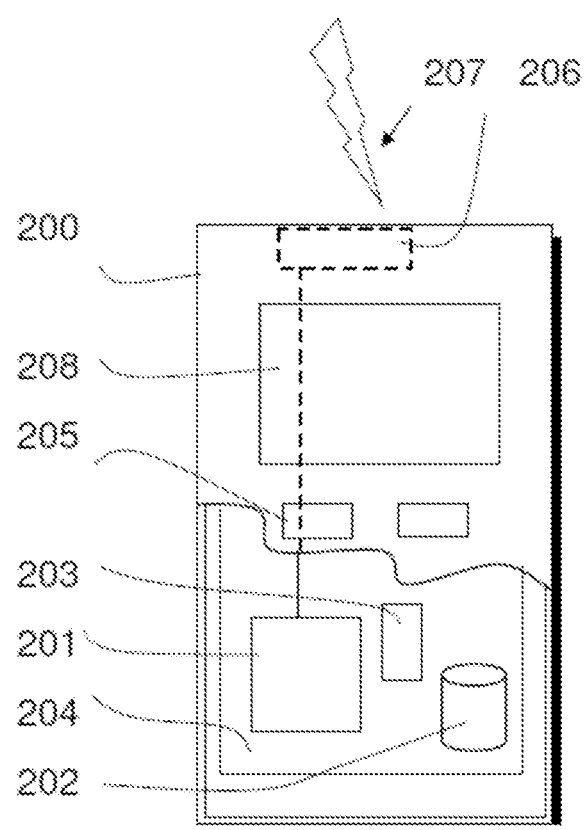
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA), a tablet or any apparatus provided with wireless communication capabilities. A mobile communication device may provide, for example, communication of data for carrying communications such as voice, electronic mail (email), text message, multimedia and so on. Communication devices may provide numerous services. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signaling mechanisms and procedures, which may enable a device to address in-device coexistence (IDC) issues caused by multiple transceivers, may be provided with help from the LTE network. The multiple transceivers may be configured for providing radio access to different radio technologies.

As discussed above, there is a need to specify a processing scheme in a communication system to define whether and when uplink power adjustments due to a TPC command take effect in a UE, when the DMRS bundling feature is enabled. This processing scheme should be independent of the type of downlink control information in which a TPC command is transmitted.

The current specifications offer two options for uplink scheduling grants on a data channel, such as PUSCH in NR. In one option, which is in the following referred to as dynamic grant (DG) PUSCH scheduling, resource allocation for PUSCH transmission(s) is provided in downlink control information (DCI) conveyed by a control channel, such as PDCCH. In another option, which is in the following referred to as configured grant (CG) PUSCH scheduling, resource allocation for PUSCH transmission(s) is preconfigured by higher layer. The PUSCH transmission(s) with configured grant can be triggered/activated by a DCI or Multiple Access Control (MAC) control element (MAC-CE).

3GPP specification TS 38.213 specifies the PUSCH power control dynamic adjustment and how a UE is supposed to calculate the dynamic change to its power control based on the received TPC commands, for a certain transmission occasion i. A transmission occasion is defined in the same specification as follows:

A PUSCH/PUCCH/SRS/PRACH transmission occasion i is defined by a slot index $n_{s,f}^\mu$ within a frame with system frame number SFN, a first symbol S within the slot, and a number of consecutive symbols L. For a PUSCH transmission with repetition Type B, a PUSCH transmission occasion is a nominal repetition [6, TS 38.214].

According to TS 38.213, to determine the power control adjustment for transmission occasion i, the UE accumulates the received TPC command values between $K_{PUSCH}(i-i_0)-1$ symbols before PUSCH transmission occasion $i-i_0$ and $K_{PUSCH}(i)$ symbols before PUSCH transmission occasion i, wherein $i_0>0$ is determined by the UE as the smallest integer for which $K_{PUSCH}(i-i_0)$ symbols before PUSCH transmission occasion $i-i_0$ is earlier than $K_{PUSCH}(i)$ symbols before PUSCH transmission occasion i. The definition of $K_{PUSCH}(i)$ depends on whether the PUSCH transmissions is scheduled by a DCI format or configured with a configured grant as follows:

PUSCH transmission scheduled by a DCI format: $K_{PUSCH}(i)$ is a number of symbols for active UL BWP b of carrier f of serving cell c after a last symbol of a corresponding PDCCH reception and before a first symbol of the PUSCH transmission.

PUSCH transmission is configured by ConfiguredGrant-Config: $K_{PUSCH}(i)$ is a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of serving cell c.

Figure 3:
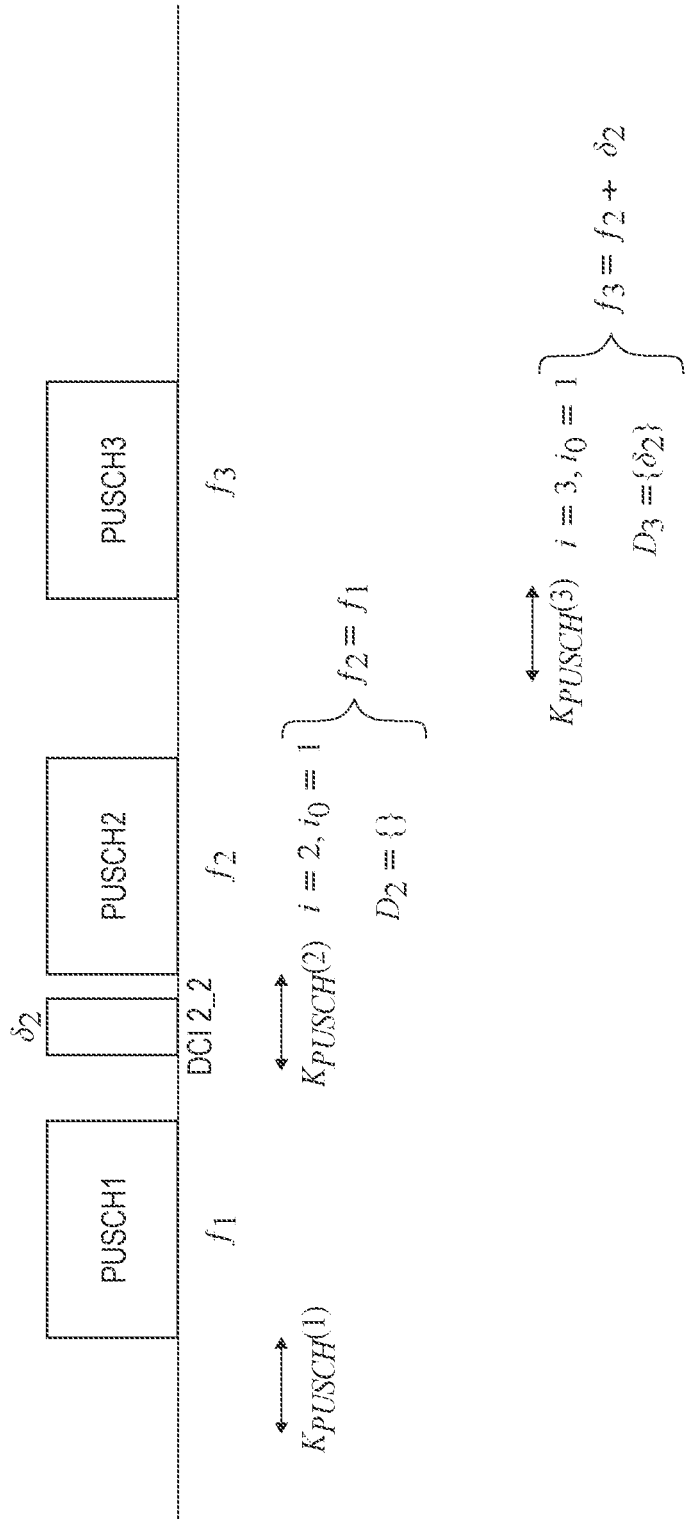
FIG. 3 shows a schematic diagram illustrating an example of a TPC command for PUSCH transmissions with a configured grant.

FIG. 3 shows an example scenario of TPC command application in case of PUSCH transmissions with a configured grant. For this case, a UE is supposed to calculate $K_{PUSCH}(i)$, as a number of symbols equal to the product of a number of symbols per slot ($N_{symb}^{slot}$), e.g., $N_{symb}^{slot}=14$ for CP-OFDM, and the minimum of the values provided by k2 in PUSCH-ConfigCommon for active UL BWP b of carrier f of serving cell c. This results in the same $K_{PUSCH}(i)$, for all PUSCH transmission occasions, i.e., $K_{PUSCH}(1)=K_{PUSCH}(2)=K_{PUSCH}(3)$ in the example of FIG. 3. For transmission occasion i=2 (PUSCH2), $i_0=1$ is a valid value. The UE has not received any TPC command between the start of $K_{PUSCH}(2)$ and $K_{PUSCH}(1)$, and hence the power control state $f_2=f_1$. For transmission occasion i=3 (PUSCH3), $i_0=1$ is a valid value. However, the UE has received the TPC command $\delta_2$ between the start of $K_{PUSCH}(3)$ and $K_{PUSCH}(2)$, and hence will apply $\delta_2$ to the power control state, yielding $f_3=f_2+\delta_2$.

"DMRS bundling" or "joint channel estimation" for PUSCH and PUCCH transmissions may be used in NR. This feature targets improvements in the channel estimation quality for the demodulation of PUSCH/PUCCH at the receiver (gNB) by using jointly the DMRS symbols among several PUSCH/PUCCH transmissions (likely in different slots) that comply with required conditions to maintain power consistency and phase continuity. The DMRS symbols belonging to several PUSCH/PUCCH transmissions can be jointly used to provide a more reliable channel estimate if they are subject to very similar, if not identical, channel and/or transmission conditions. In NR, when DMRS bundling is enabled, the UE may be expected to maintain power consistency and phase continuity within a time domain window (TDW). The PUSCH/PUCCH repetitions may be covered by one or multiple TDWs. More precisely, the TDW determination may contain two steps.

Firstly, one or multiple nominal TDWs may be determined to cover the PUSCH/PUCCH repetitions.

Secondly, within a nominal TDW, if an event that breaks power consistency and phase continuity occurs, the nominal TDW may be segmented into multiple actual TDWs. The UE is required to keep power consistency and phase continuity within each actual TDW.

An application of a Transmission Power Control (TPC) command by a UE can be such an event, depending on when the TPC command takes effect at the UE. Therefore, if a UE is configured to use DMRS bundling, a TPC command should be applied in a manner that maintains phase continuity and power consistency across bundled DMRS symbols. In practice, no power control command should take effect during a nominal TDW. In particular, in the case of Configured Grant (CG) PUSCH a UE may not be able to maintain power and phase continuity throughout a nominal time domain window if TPC commands are received in between PUSCH repetitions of the same window.

Figure 4:
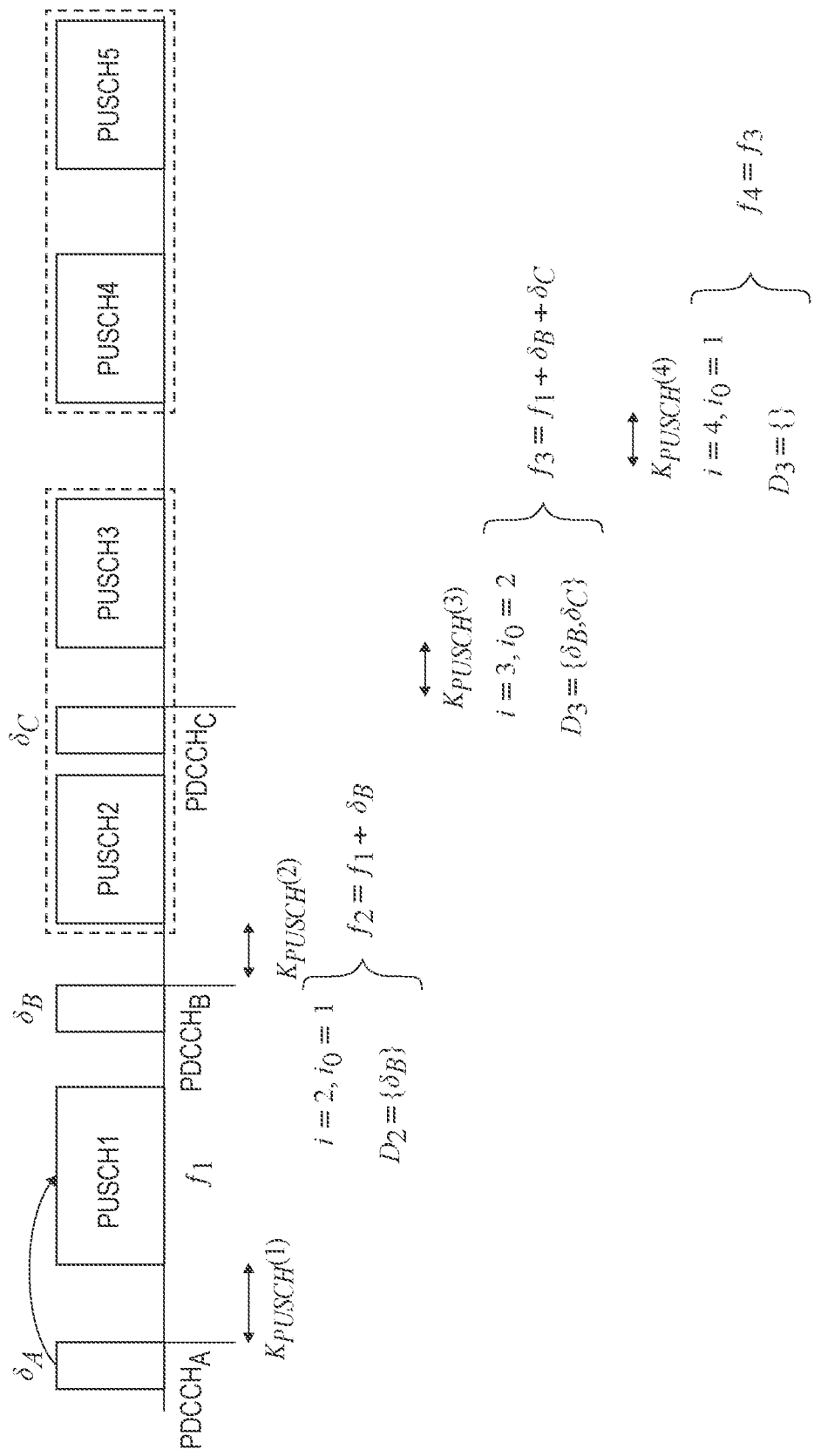
FIG. 4 shows a schematic diagram illustrating a legacy TPC command procedure for CG PUSCH transmissions within a same nominal TDW.

FIG. 4 provides further insight into this problem. The two dashed boxes in FIG. 4 show two nominal TDWs. Since the UE receives TPC command $\delta_c$ between repetition 2 (PUSCH2) and repetition 3 (PUSCH3) belonging to the same TDW, the power of PUSCH transmission occasion 3 may be different from the power of PUSCH transmission occasion 2, and may cause a power and/or phase discontinuity and may thus not allow joint channel estimation over repetition 2 (PUSCH2) and repetition 3 (PUSCH3).

Current NR specifications do not allow a UE to apply any power update to PUSCH repetitions that are dynamically scheduled by a PDCCH if the TPC command is provided in DCI format 2_2 conveyed by another PDCCH that comes after the scheduling PDCCH, in the case of DG PUSCH. In this case, the TPC command provided by DCI format 2_2 cannot be timely applied to any of the PUSCH repetitions in any of the nominal TDWs.

Figure 5:
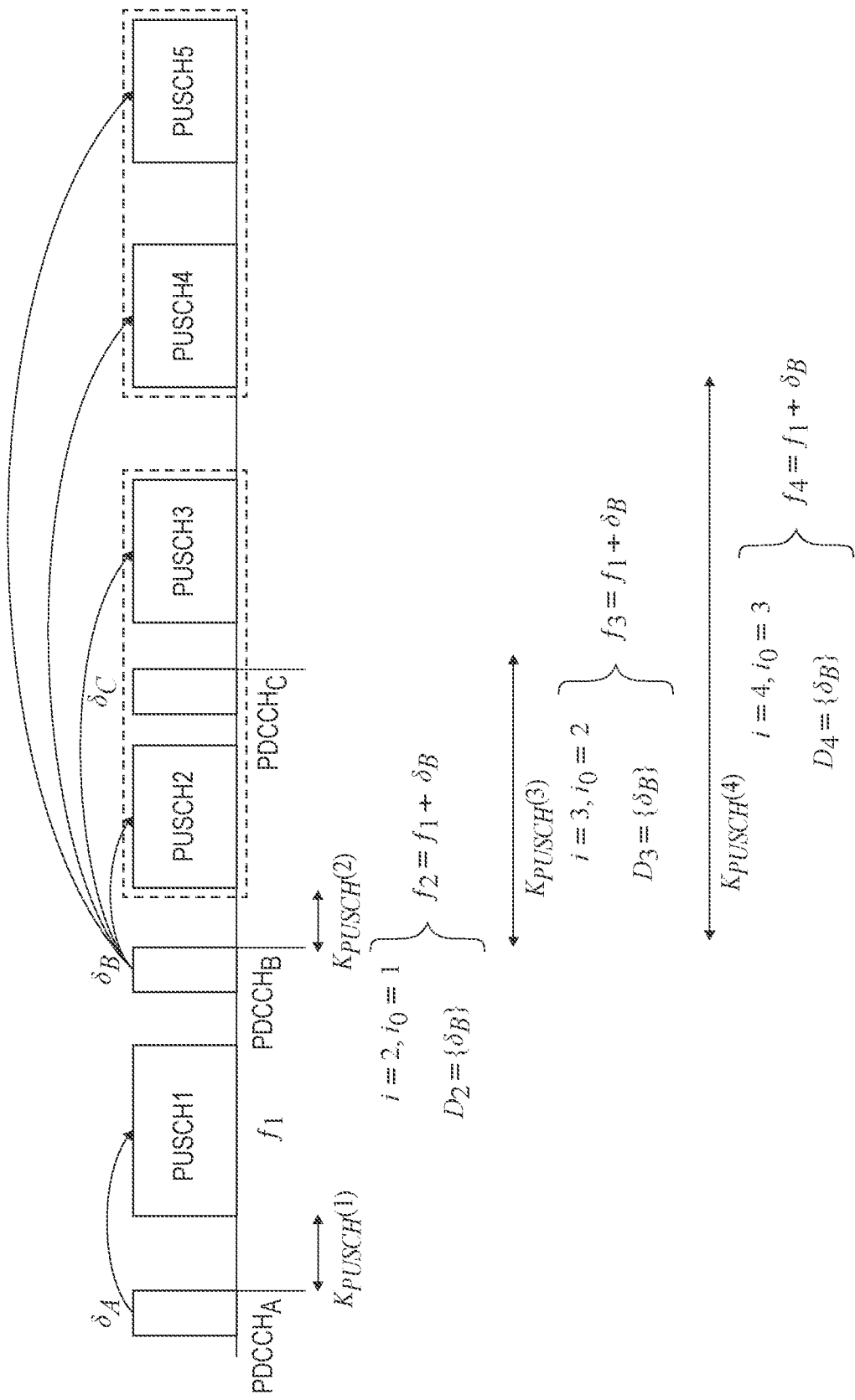
FIG. 5 shows a schematic diagram illustrating a legacy TPC command procedure for DG PUSCH transmission occasions.

Indeed, as shown in FIG. 5, where the dashed boxes represent nominal TDWs, the TPC command $\delta_C$ conveyed by $PDCCH_C$ (which is assumed to be carrying DCI format 2_2 in this example) is not applied to any of the PUSCH repetitions scheduled by $PDCCH_B$, i.e., PUSCH repetitions PUSCH2, PUSCH3, PUSCH4, PUSCH5 of FIG. 5. This can be detrimental in coverage shortage scenarios, where the UE would benefit from applying the latest TPC command as quickly as possible.

DMRS bundling offers a way to overcome this limitation thanks to the introduction of nominal TDWs, which encompass a number of slots/transmission occasions (TOs). This allows to consider each nominal TDW independently and potentially adapt the transmit power used in each of its slots in a timely manner accordingly.

One possibility to allow a UE to preserve phase continuity and power consistency across PUSCH repetitions which are part of the same nominal TDW is to define a transmission occasion for DMRS bundling as a number of slots as large as the nominal TDW duration and prevent the application of any TPC command during the duration of the nominal TDW. However, such a modification of the definition of transmission occasion would force the gNB and UEs in the network to handle two concepts of transmission occasion at the same time, namely a transmission occasion comprising one slot versus a transmission occasion comprising multiple slots. This leads to unpredictable implementation impacts. Additionally, even if the transmission occasion is redefined to be equal to a nominal TDW, this approach would not allow for a timely application of one or more TPC commands provided by DCI format 2_2 to any PUSCH repetition in case the PUSCH is scheduled via DCI, i.e., DG PUSCH, for the same reasons outlined above with reference to FIG. 5.

Figure 6:
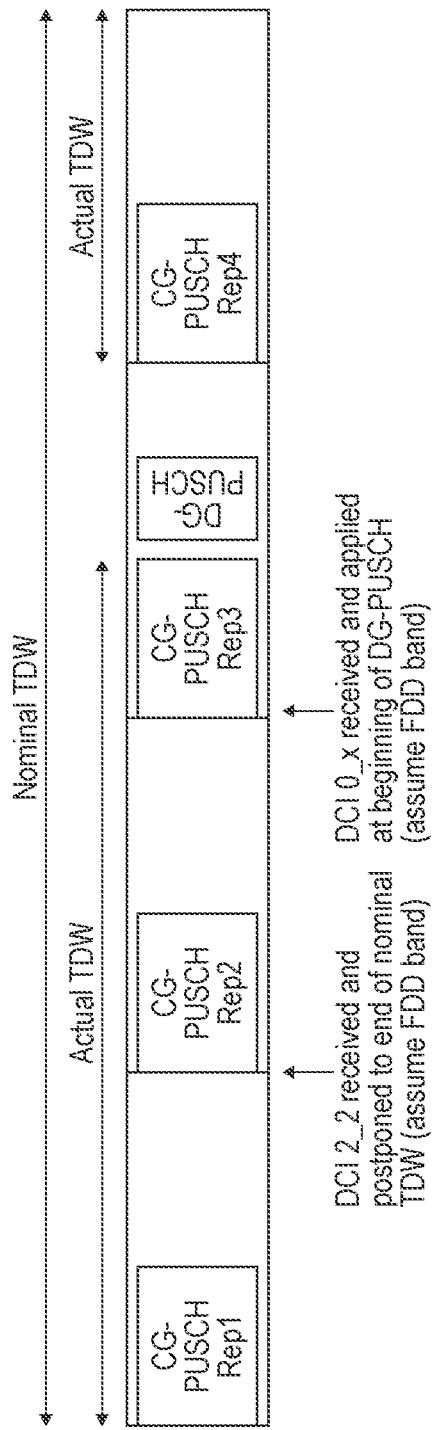
FIG. 6 shows a schematic diagram illustrating a known TPC command procedure.

An alternative approach is illustrated in FIG. 6, where a schematic diagram illustrating a TPC command procedure relying on two sets of TPC commands is provided. This approach has been described in the context of the 3GPP discussions to address the issue at hand, and suggests that TPC command received via DCI 0_x can be applied within a nominal TDW, whereas TPC command received via DCI 2_2 cannot be applied within a nominal TDW. By creating two subsets of Di (Di is the set containing the TPC commands received in an interval of time), a UE would distinguish between TPC commands from DCI 0_x and TPC commands from DCI 2_2, and at the end of the TDW apply only the TPC commands belonging to the DCI 2_2 subset. However, this approach is not self-contained, and requires an additional set of rules to accompany it, to properly characterize UE behavior in case a TPC command received via DCI 0_x is received during a nominal TDW. Indeed, such DCI formats are used to schedule a PUSCH, and cannot adjust the power control of an already scheduled PUSCH, as it happens with TPC command received via DCI 2_2. However, creating two subsets of Di would not help ensuring power consistency within a nominal TDW, and rather increase complexity of the operations at the devices involved in the communication.

An alternative approach described in the context of the 3GPP discussions, to address the issue at hand, requires the definition of new parameters. Specifically, it is proposed to add a condition for TPC adjustment in 38.213, such that in case DMRS bundling is enabled, a UE uses the "legacy" power control formula for the first transmission within a nominal TDW and sets the transmission power equal to the first transmission for the remaining transmission occasions within the nominal TDW. This approach does not consider the fact that all DCI formats 2_2 received prior to the last TO of a nominal TDW would not be applied when the first TO of the subsequent TDW occurs, given that the condition for this to happen would not be satisfied (as per descriptions provided before, and in TS 38.213). For example, consider the PUSCH4 transmission in the scenario of FIG. 4. According to this approach, a UE would only consider the TPC commands received between the start of $K_{PUSCH}(3)$ and the start of $K_{PUSCH}(4)$ when calculating the transmission power for PUSCH4, which does not include the TPC command $\delta_C$ conveyed by $PDCCH_C$.

A method for allowing a UE to postpone application of TPC commands to the end of a nominal TDW without modifying the definition of transmission occasion is hence necessary.

In this application a method is disclosed for allowing a UE to postpone application of TPC commands to the end of a configured TDW without modifying the current definition of transmission occasion or the formulas/equations regulating the application of the TPC commands. In particular, the method seeks to adapt the definition of the time interval $K_{PUSCH}(i)$, for transmission occasion i, in the case the feature of DMRS bundling is enabled and for the case of CG PUSCH repetitions. More specifically, it is disclosed to use a single definition of $K_{PUSCH}(i)$, for transmission occasion i, for both DG PUSCH and CG PUSCH. Hence, the disclosed method solves all the issues discussed above for uplink power adjustment when DMRS bundling is applied.

Specifically, a new definition of time intervals $K_{PUSCH}(i)$ in case of DMRS bundling is disclosed, such that the starting symbol of each time interval measured in number of symbols is the same for all transmission occasions i within a nominal TDW. The end symbol of the new time interval $K_{PUSCH}(i)$, when DMRS bundling feature is enabled, may be the last symbol before the start of PUSCH transmission occasion i. In particular, the new definition of the time intervals $K_{PUSCH}(i)$ ensures that $K_{PUSCH}(j) \subseteq K_{PUSCH}(k) \subseteq K_{PUSCH}(l)$ if $l>k>j$ for transmission occasions j, k and l within the same nominal TDW. This implies that the interval between the time intervals $K_{PUSCH}(i)$ associated to all transmission occasions within the nominal TDW may be a degenerate interval (size equal to 0) and hence a UE may automatically not adjust the power control state in a nominal TDW, regardless of whether the PUSCH has been scheduled via DG or CG. The power control state may therefore only be adjusted after the nominal TDW, and the new power control state may therefore only be used in a transmission occasion within the next nominal TDW. For example, the UE may perform power adjustment at the beginning of the next nominal TDW based on a combination, such as accumulation, of received TPC commands. Specifically, the new definition ensures that a TPC command in DCI format 2_2 received within a nominal TDW will not satisfy the conditions for its application, i.e., power adjustment based on the TPC command, within the nominal TDW. The TPC command in DCI format 2_2 may therefore be accumulated and applied after the end of the nominal TDW.

Figure 7:
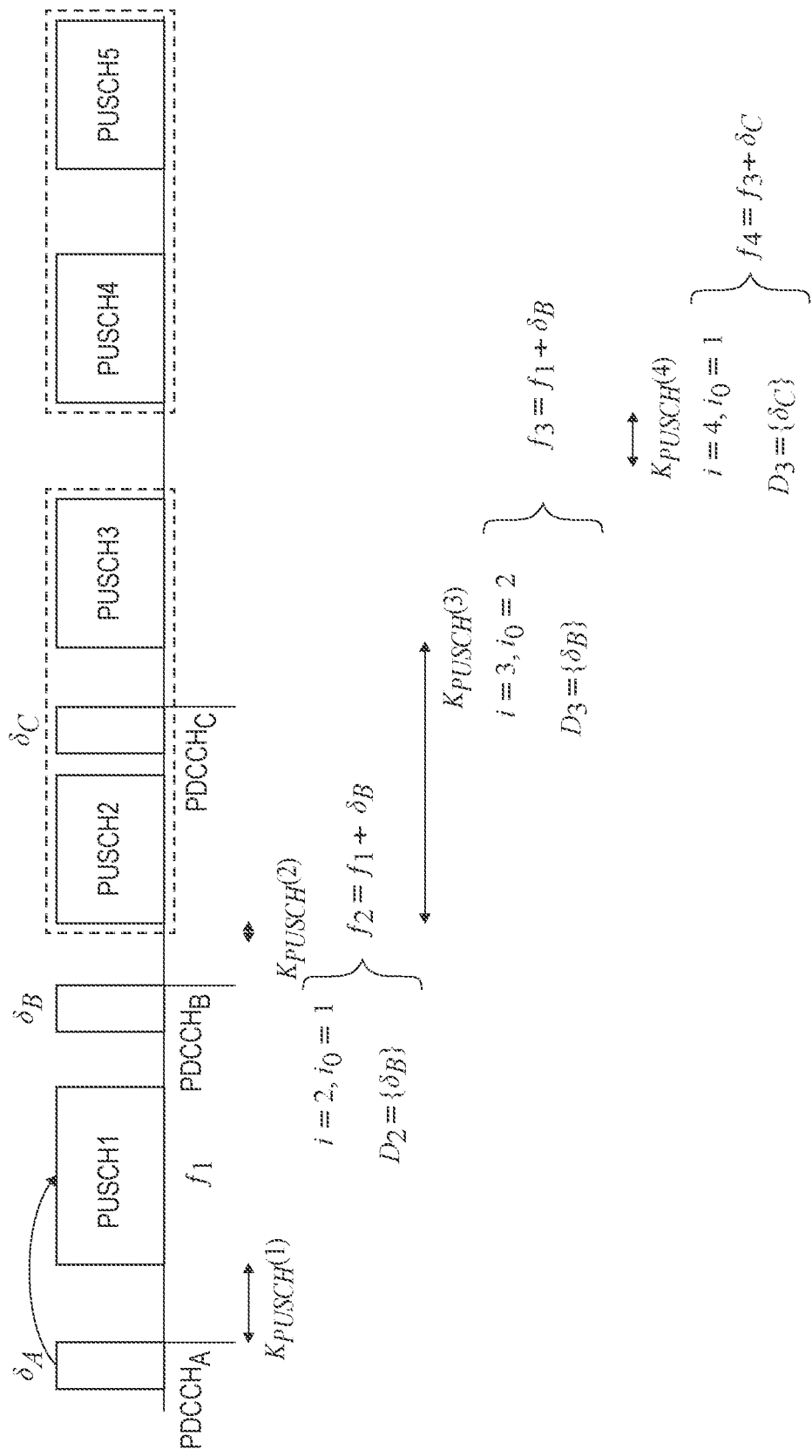
FIG. 7 shows a schematic diagram illustrating a first embodiment of a new TPC command procedure.

FIG. 7 shows a schematic diagram illustrating a first embodiment of a new TPC command application procedure. FIG. 7 illustrates the uplink power control adjustment at a UE when applying the new definition of time intervals $K_{PUSCH}(i)$ disclosed in this application. In the example shown in FIG. 7, the common starting point of all time intervals $K_{PUSCH}(i)$ is the first symbol of the nominal TDW. Even if a TPC command for power adjustment $\delta_c$ is received at a UE between PUSCH transmission occasion 2 and 3, the UE will not take the indicated power adjustment into effect for PUSCH transmission occasion 3 since it belongs to the same TDW as PUSCH transmission occasion 2. Instead, the UE will apply the indicated power adjustment $\delta_c$ only in PUSCH transmission occasion i=4 which belongs to a different TDW, and for which the start of $K_{PUSCH}(3)$ is earlier than the start of $K_{PUSCH}(4)$. FIG. 7 shows only one TPC command received within the first TDW. However, the new TPC command procedure of FIG. 7 may be applied to any number of TPC commands received within the first TDW.

The common starting point of time intervals $K_{PUSCH}(i)$ for all transmission occasions i within a nominal TDW may be the first symbol of the nominal TDW when DMRS bundling is used, as shown in FIG. 7.

Alternatively, if DMRS bundling is used, the common starting point of time intervals $K_{PUSCH}(i)$ for all transmission occasions i within a nominal TDW may be a symbol preceding the start of the nominal TDW and identified via suitable offset equal to a predetermined number of symbols before the start of the nominal TDW.

Alternatively, if DMRS bundling is used, the common starting point of time intervals $K_{PUSCH}(i)$ for all transmission occasions i within a nominal TDW may be the last symbol of the PDCCH activating or scheduling the PUSCH.

Alternatively, if DMRS bundling is used, the common starting point of time intervals $K_{PUSCH}(i)$ for all transmission occasions i within a nominal TDW may be the $(N_{symb}^{slot} \times k2+1)$-th symbol after the activating or scheduling PDCCH, where $N_{symb}^{slot}$ is a number of symbols per slot, and k2 is the minimum of the values provided by k2 in PUSCH-ConfigCommon.

Alternatively, if DMRS bundling is used, the common starting point of time intervals $K_{PUSCH}(i)$ for all transmission occasions i within a nominal TDW may be equal to the number of symbols from the end of the previous nominal TDW and the start of the nominal TDW plus one symbol.

Figure 8:
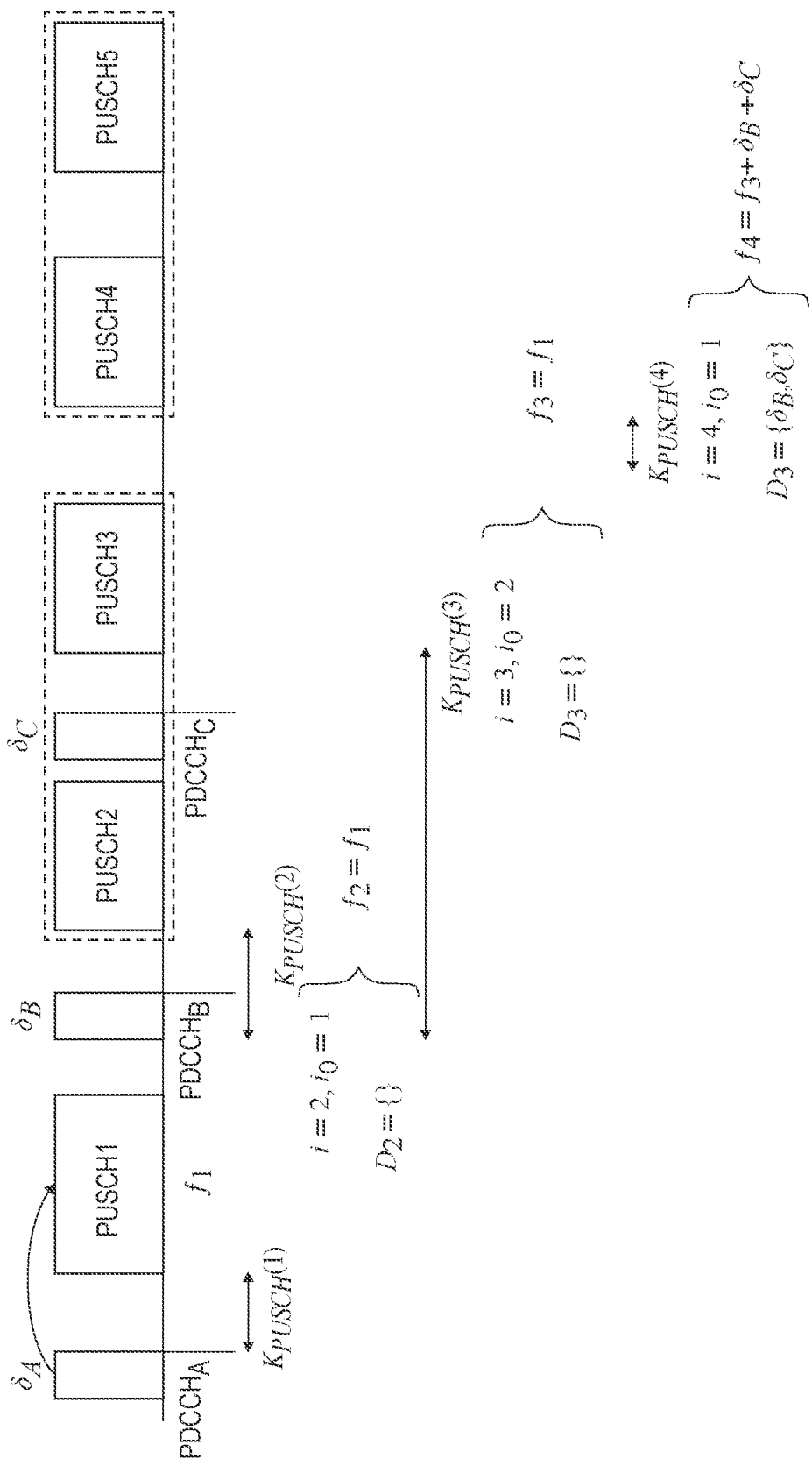
FIG. 8 shows a schematic diagram illustrating a second embodiment of a new TPC command procedure.

FIG. 8 shows a schematic diagram illustrating another exemplary embodiment of a new TPC command procedure, if DMRS bundling is used, wherein the common starting point of all time intervals $K_{PUSCH}(i)$ corresponding to all the transmission occasions i within a nominal TDW is the $(N_{symb}^{slot} \times k2)$-th symbol before the start of the nominal TDW, where $N_{symb}^{slot}$ is a number of symbols per slot, and k2 is the minimum of the values provided by k2 in PUSCH-ConfigCommon.

Figure 9:
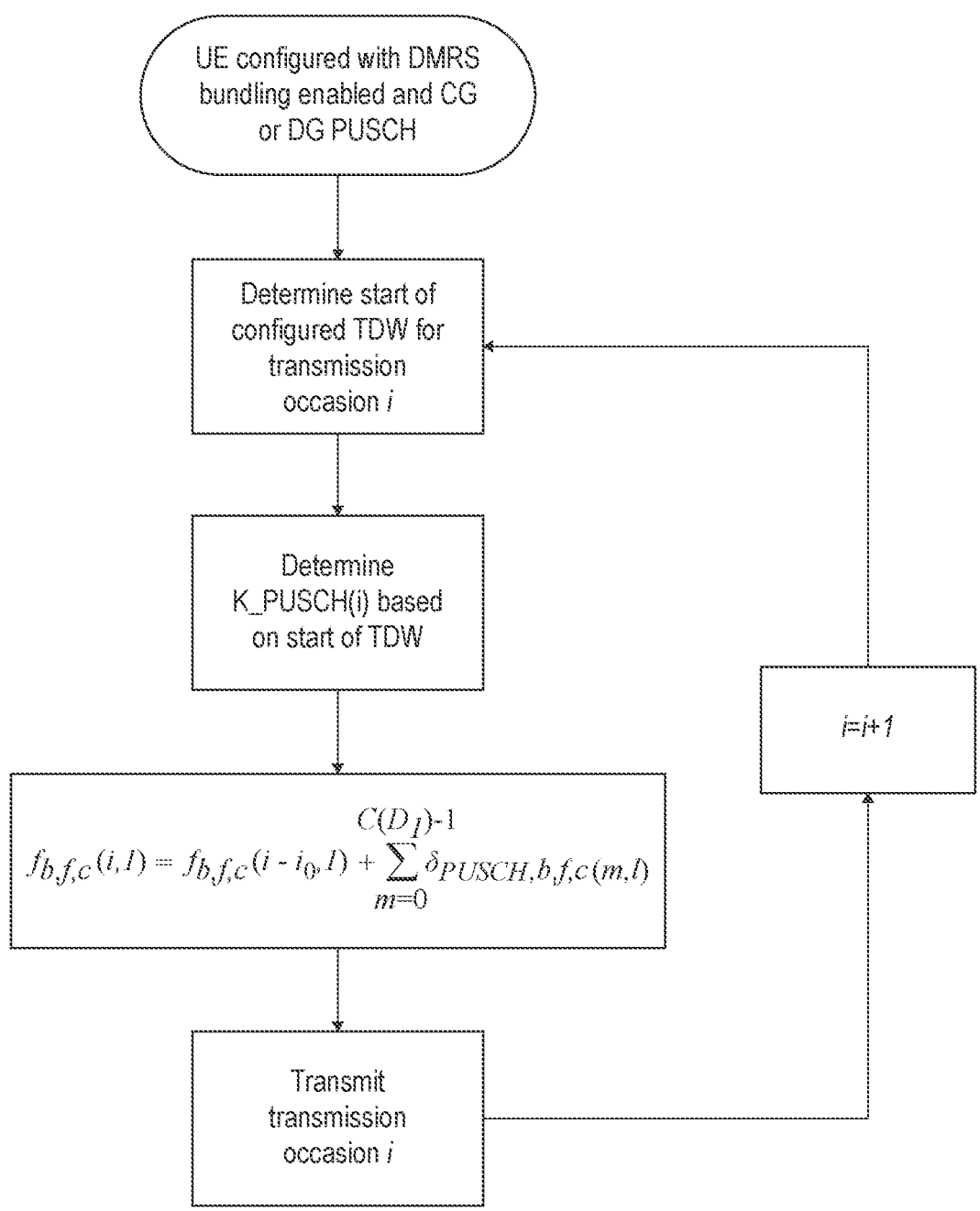
FIG. 9 shows a flow chart of the new TPC command procedure.

FIG. 9 shows a flow chart of a TPC command procedure according to the application:

Step 1: UE is RRC configured with DMRS bundling and DG or CG PUSCH with a number of transmissions Step 2: For a certain transmission i (in this context we will refer to it with the more generic term transmission occasion i), UE determines the start of the configured TDW the transmission occasion i belongs to Step 3: UE determines $K_{PUSCH}(i)$. The determination may comprise a determination of a common starting point of the time intervals $K_{PUSCH}(i)$ for all transmission occasions i within a nominal TDW according to any method set forth above.

Step 4: UE adjusts the power control based on a power control formula, and taking into account all the TPC commands received outside of the current TDW Step 5: UE transmits transmission occasion i with the power determined in Step 4

Figure 10:
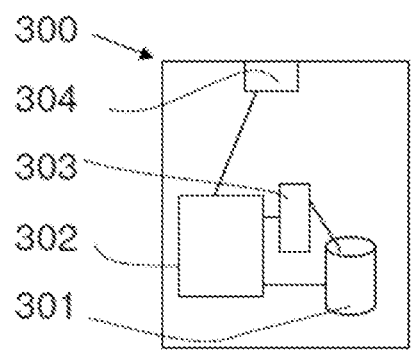
FIG. 10 shows a method of the new TPC command procedure performed by a communication device.

FIG. 10 shows an example method of a new TPC command procedure performed by a communication device.

At step 1010, the communication device may receive configuration information for configuring a transmission of a reference signal. A signal property of the reference signal may be configured to be maintained in a time window. For example, the communication device may be configured to use "DMRS bundling" or "joint channel estimation", which requires that certain reference signal properties, such as power consistency and/or phase continuity be maintained over the time window.

At step 1020, the communication device may receive control information for controlling an uplink transmission using at least two transmission occasions comprising the reference signal, wherein a first transmission occasion may occur within the time window and before a second transmission occasion. Specifically, the control information may comprise an indication and/or configuration information for causing transmission of the uplink transmission and/or for configuring the at least two transmission occasions. The second transmission occasion may or may not occur within the time window.

At step 1030, the communication device may determine a first time interval, wherein the first time interval starts at a first starting point and ends at the latest with the start of the first transmission occasion. The first time interval may, for example, end before the start of the first transmission occasion.

At step 1040, the communication device may determine a second time interval, wherein the second time interval starts at a second starting point and ends at the latest with the start of the second transmission occasion. The second time interval may, for example, end before the start of the second transmission occasion. The first starting point may coincide with the second starting point if the second transmission also occurs within the time window, and otherwise the second starting point may be after the first starting point.

At step 1050, the communication device may receive at least one transmit power control command for uplink transmission power adjustment.

At step 1060, the communication device may perform uplink transmission power adjustment according to the at least one transmit power control command. The transmit power control command may take effect only in the second transmission occasion but not in the first transmission occasion, if the at least one transmit power control command is received after the first starting point but not after the second starting point. In other words, a transmit power setting may be changed between the first transmission occasion and the second transmission occasion only if the at least one transmit power control command is received between the starting OFDM symbol (first starting point) of the first time interval and the starting OFDM symbol (second starting point) of the second time interval.

The first starting point of step 1030 may be one of:
the first symbol of the time window,
a symbol offset by a predetermined number of symbols from the first symbol of the time window, the last symbol of a control channel carrying the control information, a symbol offset by a predetermined number of symbols from the last symbol of a control channel carrying the control information, the ($N_{symb}^{slot} \times k2+1$)-th symbol after the control channel carrying the control information, wherein $N_{symb}^{slot}$ is a number of symbols per slot, and k2 is minimum of a set of values provided by higher layer signalling, the symbol after the end of the previous time window.

($N_{symb}^{slot} \times k2$)-th symbol before the first symbol of the time window, wherein $N_{symb}^{slot}$ is a number of symbols per slot, and k2 is minimum of a set of values provided by higher layer signalling.

The reference signal of step 1010 may be a demodulation reference signal.

The signal property of step 1010 may be at least one of:
phase continuity, and
power consistency.

The control information of step 1020 may be received in a dynamic grant or in an activation of a configured grant or in radio resource control signalling.

The configuration information of step 1010 may be received in radio resource control signalling.

The uplink transmission of step 1020 may be transmitted in a radio access network for New Radio.

Abbreviations:
PUSCH: Physical Uplink Shared Channel
CG PUSCH: Configured Grant PUSCH
RRC: Radio Resource Control
DMRS: Demodulation Reference Signal
TDW: Time Domain Window
TPC: Transmission Power Control
UE: User Equipment

The invention claimed is:

1. A method comprising:
receiving configuration information for configuring a transmission of a reference signal, wherein a signal property of the reference signal is configured to be maintained in a time window;
receiving control information for controlling an uplink transmission using at least two transmission occasions comprising the reference signal, wherein a first transmission occasion occurs within the time window and before a second transmission occasion;
determining a first time interval, wherein the first time interval starts at a first starting point and ends at the latest with the start of the first transmission occasion;
determining a second time interval, wherein the second time interval starts at a second starting point and ends at the latest with the start of the second transmission occasion;
wherein the first starting point coincides with the second starting point if the second transmission occasion also occurs within the time window, and otherwise the second starting point is after the first starting point;
receiving at least one transmit power control command for uplink transmission power adjustment; and
performing an uplink transmission power adjustment according to the at least one transmit power control command that takes effect only in the second transmission occasion but not in the first transmission occasion, if the at least one transmit power control command is received after the first starting point but not after the second starting point.

2. The method according to claim 1, wherein the first starting point is one of:
a first symbol of the time window,
a symbol offset by a predetermined number of symbols from the first symbol of the time window,
a last symbol of a control channel carrying the control information,
a symbol offset by a predetermined number of symbols from the last symbol of a control channel carrying the control information,
($N_{symb}^{slot} \times k2+1$)-th symbol after the control channel carrying the control information, wherein $N_{symb}^{slot}$ is a number of symbols per slot, and k2 is minimum of a set of values provided by higher layer signalling,
a symbol after an end of a previous time window,
($N_{symb}^{slot} \times k2$)-th symbol before the first symbol of the time window, wherein $N_{symb}^{slot}$ is a number of symbols per slot, and k2 is minimum of a set of values provided by higher layer signalling.

3. The method according to claim 1, wherein the reference signal is a demodulation reference signal.

4. The method according to claim 1, wherein the signal property is at least one of:
phase continuity, and
power consistency.

5. The method according to claim 1, wherein the control information is received in a dynamic grant or in an activation of a configured grant or in radio resource control signalling.

6. The method according to claim 1, wherein the configuration information is received in radio resource control signalling.

7. The method according to claim 1, wherein the uplink transmission is transmitted in a radio access network for New Radio.

8. An apparatus comprising:
at least one processor and at least one memory including a computer program code, the at least one memory and the computer program code configured to, with the at least one processor, cause the apparatus at least to:
receive configuration information for configuring a transmission of a reference signal, wherein a signal property of the reference signal is configured to be maintained in a time window;
receive control information for controlling an uplink transmission using at least two transmission occasions comprising the reference signal, wherein a first transmission occasion occurs within the time window and before a second transmission occasion;
determine a first time interval, wherein the first time interval starts at a first starting point and ends at the latest with the start of the first transmission occasion;
determine a second time interval, wherein the second time interval starts at a second starting point and ends at the latest with the start of the second transmission occasion;
wherein the first starting point coincides with the second starting point if the second transmission occasion also occurs within the time window, and otherwise the second starting point is after the first starting point;
receive at least one transmit power control command for uplink transmission power adjustment; and
perform an uplink transmission power adjustment according to the at least one transmit power control command that takes effect only in the second transmission occasion but not in the first transmission occasion, if the at least one transmit power control command is received after the first starting point but not after the second starting point.

9. The apparatus according to claim 8, wherein the first starting point is one of:
   a first symbol of the time window,
   a symbol offset by a predetermined number of symbols from the first symbol of the time window,
   a last symbol of a control channel carrying the control information,
   a symbol offset by a predetermined number of symbols from the last symbol of a control channel carrying the control information,
   $(N_{symb}^{slot} \times k2+1)$-th symbol after the control channel carrying the control information, wherein $N_{symb}^{slot}$ is a number of symbols per slot, and k2 is minimum of a set of values provided by higher layer signalling,
   a symbol after an end of a previous time window,
   $(N_{symb}^{slot} \times k2)$-th symbol before the first symbol of the time window, wherein $N_{symb}^{slot}$ is a number of symbols per slot, and k2 is minimum of a set of values provided by higher layer signalling.

10. The apparatus according to claim 8, wherein the reference signal is a demodulation reference signal.

11. The apparatus according to claim 8, wherein the signal property is at least one of:
    phase continuity, and
    power consistency.

12. The apparatus according to claim 8, wherein the control information is received in a dynamic grant or in an activation of a configured grant or in radio resource control signalling.

13. The apparatus according to claim 8, wherein the configuration information is received in radio resource control signalling.

14. The apparatus according to claim 8, wherein the uplink transmission is transmitted in a radio access network for New Radio.

15. A non-transitory computer-readable storage medium comprising instructions stored thereon that, when executed by at least one processor, are configured to cause an apparatus to:
    receive configuration information for configuring a transmission of a reference signal, wherein a signal property of the reference signal is configured to be maintained in a time window;
    receive control information for controlling an uplink transmission using at least two transmission occasions comprising the reference signal, wherein a first transmission occasion occurs within the time window and before a second transmission occasion;
    determine a first time interval, wherein the first time interval starts at a first starting point and ends at the latest with the start of the first transmission occasion;
    determine a second time interval, wherein the second time interval starts at a second starting point and ends at the latest with the start of the second transmission occasion;
    wherein the first starting point coincides with the second starting point if the second transmission occasion also occurs within the time window, and otherwise the second starting point is after the first starting point;
    receive at least one transmit power control command for uplink transmission power adjustment; and
    perform an uplink transmission power adjustment according to the at least one transmit power control command that takes effect only in the second transmission occasion but not in the first transmission occasion, if the at least one transmit power control command is received after the first starting point but not after the second starting point.

* * * * *